United States Patent
Yang et al.

(10) Patent No.: US 7,379,197 B2
(45) Date of Patent: May 27, 2008

(54) APPARATUS FOR CONTROLLING PRINTER TO IMPROVE PRINTING SPEED AND METHOD THEREOF

(75) Inventors: Seung-Sik Yang, Yongin (KR); Byung-Oh Park, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/218,712

(22) Filed: Sep. 6, 2005

(65) Prior Publication Data
US 2006/0017977 A1    Jan. 26, 2006

Related U.S. Application Data

(63) Continuation-in-part of application No. 09/820,808, filed on Mar. 30, 2001, now Pat. No. 6,954,283.

(30) Foreign Application Priority Data
Jan. 10, 2001    (KR)    ................................. 01-1346

(51) Int. Cl.
  *G06F 15/00*    (2006.01)
(52) U.S. Cl. .................... 358/1.13; 358/1.18; 358/1.11
(58) Field of Classification Search ................. 358/1.9, 358/1.13, 1.16, 1.18, 1.11, 1.12; 345/419
See application file for complete search history.

(56) References Cited

U.S. PATENT DOCUMENTS

| | | | |
|---|---|---|---|
| 5,634,124 A | 5/1997 | Khoyi et al. | |
| 5,798,752 A | 8/1998 | Buxton et al. | |
| 5,872,573 A | 2/1999 | Adegeest | |
| 6,137,589 A | 10/2000 | Obrador et al. | |
| 6,151,464 A * | 11/2000 | Nakamura et al. | ............ 399/79 |
| 6,359,700 B1 * | 3/2002 | Briggs | ........................ 358/1.17 |
| 6,493,099 B2 * | 12/2002 | Nakagiri | ..................... 358/1.13 |
| 6,678,072 B1 * | 1/2004 | Matsuoka et al. | ........... 358/2.1 |
| 6,734,986 B1 * | 5/2004 | Kuroi et al. | ............... 358/1.16 |
| 6,882,341 B2 | 4/2005 | Yhann | |
| 6,963,412 B1 * | 11/2005 | Toda | ......................... 358/1.13 |
| 6,967,730 B2 * | 11/2005 | Tomita | ...................... 358/1.13 |

FOREIGN PATENT DOCUMENTS

KR    P2001-0004952    1/2001

OTHER PUBLICATIONS

"Notice to Submit response" issued by Korean Intellectual Property Office dated on Nov. 27, 2002.

* cited by examiner

*Primary Examiner*—Douglas Q. Tran
*Assistant Examiner*—Chan S Park
(74) *Attorney, Agent, or Firm*—Robert E. Bushnell, Esq.

(57) ABSTRACT

An apparatus for controlling a printer, by which an image is printed in a raster mode by counting the number of functions that affect the printing speed from the image, and a method thereof are provided. In this printer controlling method, a page area to be printed is classified into image data and font data, when a printing command is received from an application. Next, the image data is divided into objects and processed in units of objects. Then, the number of functions for outputting the processed objects is counted. If the counted value is equal to or greater than a limit value, the page area is converted into a bitmap.

9 Claims, 4 Drawing Sheets

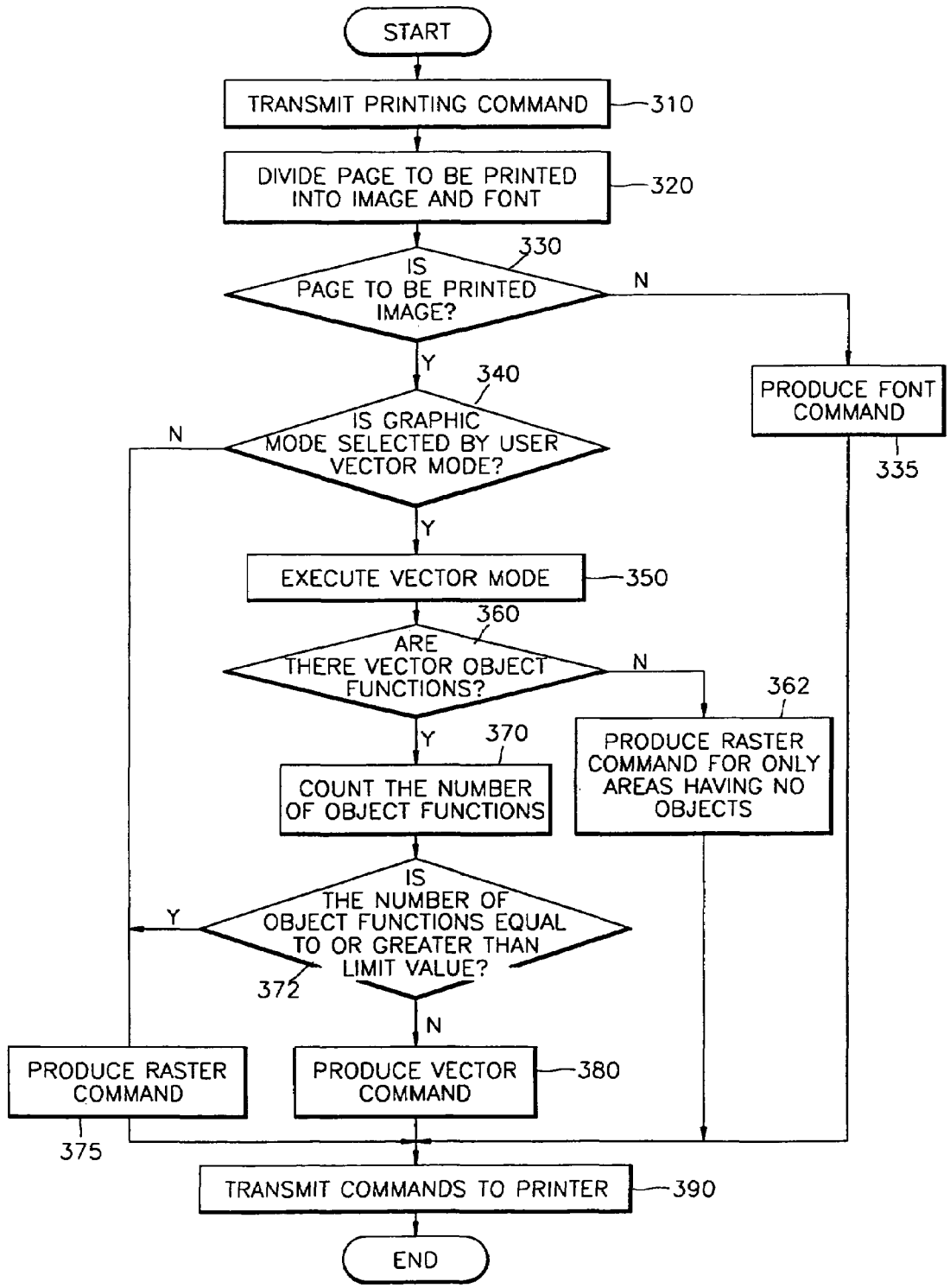

APPARATUS FOR CONTROLLING PRINTER TO IMPROVE PRINTING SPEED AND METHOD THEREOF

CROSS-REFERENCE TO RELATED APPLICATIONS

This application is a continuation-in-part application of Applicant's Ser. No. 09/820,808 filed in the U.S. Patent & Trademark Office on 30 Mar. 2001 (now U.S. Pat. No. 6,954,283), and assigned to the assignee of the present invention.

CLAIM OF PRIORITY

This application makes reference to, incorporates the same herein, and claims all benefits accruing under 35 U.S.C. §119 and §120 from my application entitled APPARATUS FOR CONTROLLING PRINTER TO IMPROVE PRINTING SPEED AND METHOD THEREOF filed with the Korean Industrial Property Office on 10 Jan. 2001 and there duly assigned Ser. No. 1346/2001 and Applicant's prior U.S. application Ser. No. 09/820,808 filed in the U.S. Patent & Trademark Office on 30 Mar. 2001.

BACKGROUND OF THE INVENTION

1. Field of the Invention

The present invention relates to a printer control system, and more particularly, to an apparatus for controlling a printer, by which an image is printed in a raster mode by counting functions, which affect the printing speed, from an image, and a method thereof.

2. Description of the Related Art

Generally, printer drivers include a font processing module and an image processing module, and control printing operations. Here, an image processing module includes a vector module and a raster (or bitmap) module. A vector module defines each image written in a document as objects and produces commands corresponding to the objects. A raster module converts an image into a bitmap in contrast with in a vector module and transmits the bitmap to a printer.

In a process for processing image data in a conventional printer driver, when an application executes a printing command to print a document, the graphic device interface (GDI) of the Windows calls the printer driver. Next, the printer driver sets a vector mode, in which a document can be more precisely printed, rather than a raster mode as a default, when typical documents are printed, and processes an image on an object-by-object basis. Here, an image included in the document of a specific application is made up of hundreds of thousands of objects.

Accordingly, the printer driver must produce a large number of vector commands if it converts these objects into vector commands. Also, when a document having complicated data is printed, a printer must interpret a large number of objects received from the printer driver and reorganize them into one page, resulting in a time-consuming printing for one page.

SUMMARY OF THE INVENTION

To solve the above problems, an objective of the present invention is to provide a method of controlling a printer, by which the printing speed is improved by counting the number of functions for outputting objects in image data and converting a page area corresponding to the counted functions into a bitmap if the number of functions is equal to or greater than a predetermined limit value.

Another object of the present invention is to provide an apparatus for controlling a printer using the printer controlling method.

It is further an object of the present invention to produce an apparatus and a method for producing font commands, raster commands, and vector commands for a printer so as to maximize printing speed.

It is also an object of the present invention to produce an apparatus and method wherein raster commands or bitmaps are submitted to the printer whenever the total number of vector object functions exceeds a predetermined number.

To achieve these and other objects of the present invention, a printer controlling method is provided, the method comprising: receiving print data; calculating a limit value according to a number of objects of the print data; determining whether the received print data is to be in a raster mode or in a vector mode based on the calculated limit value; and changing a mode of the print data according to the determined mode.

Calculating the limit value preferably comprises counting the number of objects of the print data.

The limit value is preferably changed according to a size and type of a file and a resolution of an image.

A user can preferably arbitrarily change a set value of the limit value.

The changing of a mode is preferably performed by a print driver.

To also achieve these and other objects of the present invention, a printer controlling apparatus is provided comprising: a graphic engine unit adapted to receive print data; a printer driver operatively connected to the graphic engine unit and adapted to: calculate a limit value according to a number of objects in the print data; determine whether the received print data is to be in a raster mode or a vector mode based on the calculated limit value; and changing a mode of the print data according to the determined mode.

The apparatus preferably further comprises a user interface operatively connected to the print driver and adapted to display the limit value.

The user interface is preferably adapted to set a value of the limit value in response to an input from a user to achieve these and other objects of the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a flowchart illustrating a printer controlling method according to the present invention.

DETAILED DESCRIPTION OF THE INVENTION

Figure 1:
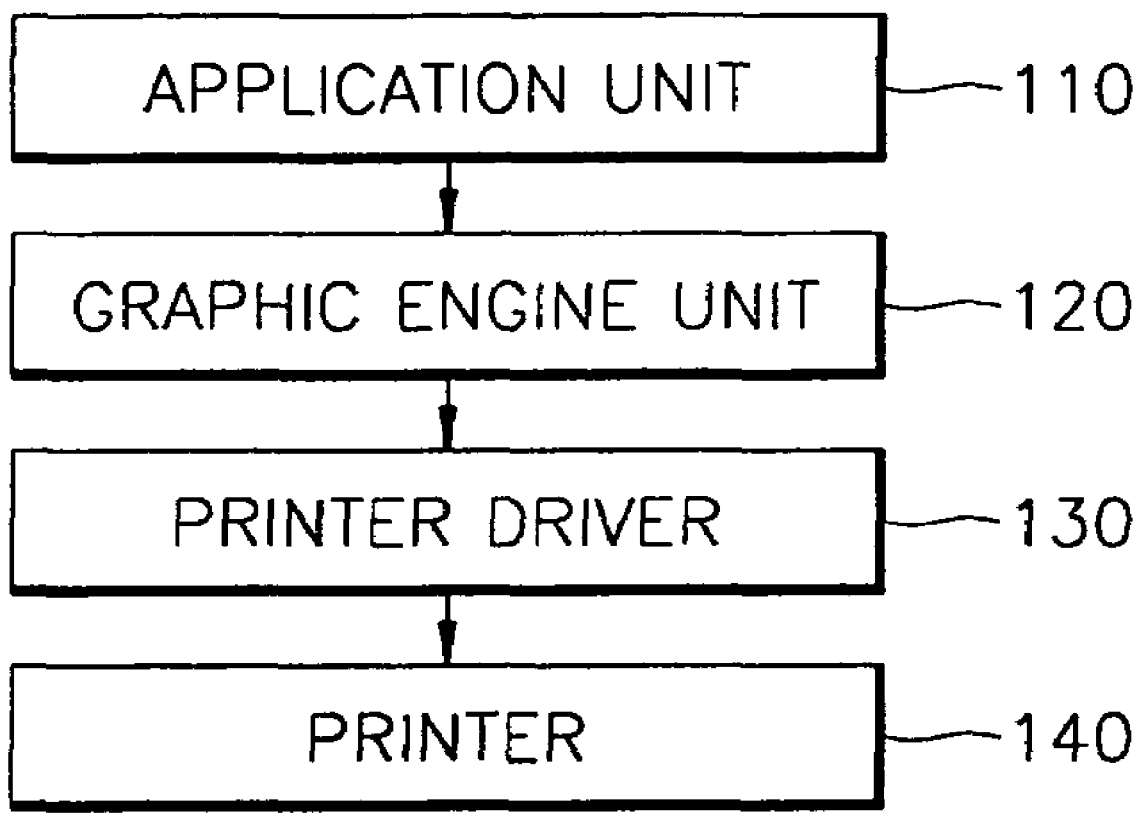
FIG. 1 is a block diagram of the entire structure of a printer controlling apparatus according to the present invention.

Referring to FIG. 1, a printer controlling apparatus according to the present invention is made up of an application unit 110, a graphic engine unit 120, a printer driver 130 and a printer 140. The application unit 110, which is a program developed to perform a specific operation using a computer, generates a data processing command such as a font, a graphic or an image depending on the characteristics of an operation for which the program has been designed. The graphic engine unit 120 includes a graphic device interface (GDI) and a device driver interface (DDI), and divides data from the application unit 110 into an image and a font and generates information on the image and information on the font.

The printer driver 130 receives image data and font data divided by the graphic engine unit 120, processes each of the data and converts the data into a command capable of being recognized by a printer, for example, into a printer control language or a postscript. Here, the printer driver 130 processes the image data in a vector mode and in a raster mode. In a vector mode, image data is divided into objects, and each of the objects is produced into a command. For example, if a document has an image of a circle and a rectangle, the printer driver 130 divides the image into objects of a circle and a rectangle, defines the coordinate, property and color of each of the objects, and converts each of the objects into a command corresponding to the defined image information items of the object. Also, in a raster mode, the image data is converted into a bitmap.

Also, the printer driver 130 individually counts functions for outputting the objects from a document, and processes the image data as a bitmap in a raster mode if the counted value is equal to or greater than a limit value, or processes the image data in a vector mode if the counted value is smaller than the limit value. The printer 140 interprets commands associated with the image and font received from the printer driver 130 and produces printable data having a resolution of, for example, 600 dpi or 1200 dpi.

Figure 2A:
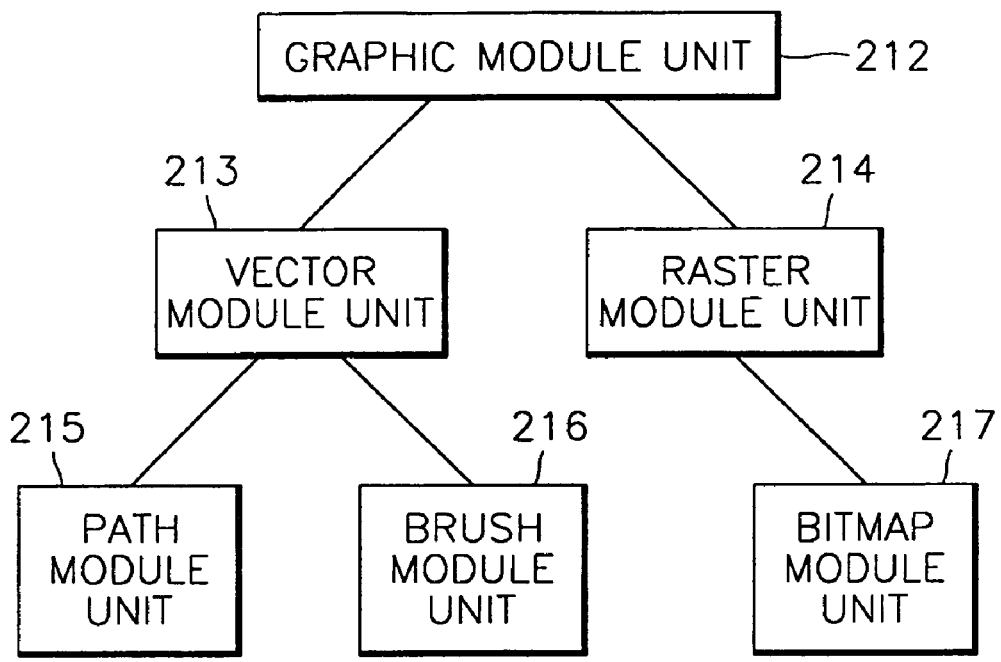
FIGS. 2A and 2B are detailed block diagrams of the print driver of FIG. 1.
Figure 2B:
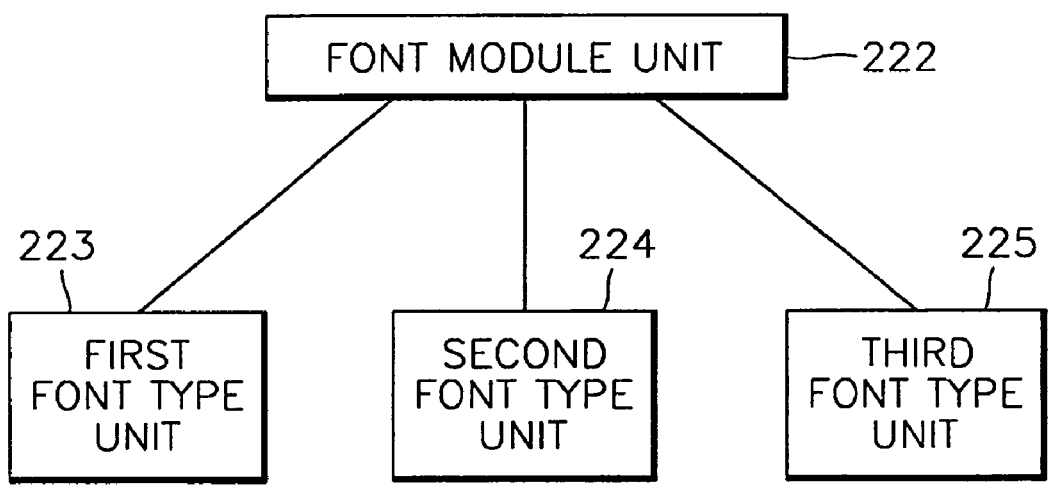

FIGS. 2A and 2B are detailed block diagrams of the print driver of FIG. 1. Referring to FIGS. 2A and 2B, the printer driver 130 is made up of a graphic module unit 212 for processing image data and a font module unit 222 for processing font data. The graphic module unit 212 is made up of a vector module unit 213 and a raster module unit 214. To be more specific, the vector module unit 213 includes a path module unit 215 for dividing the image data into objects and producing commands for the objects, and a brush module unit 216 for dividing the image data by colors and producing commands for the colors. The raster module unit 214 includes a bit map module unit 217 for converting image data into a bitmap and producing a command for the bitmap. The font module unit 222 includes a first font type unit 223 which corresponds to a download truetype font, a second front type unit 224 which corresponds to a download bitmap font, and a third font type unit 225 which corresponds to a truetype font which is graphic.

FIG. 3 is a flowchart illustrating a printer controlling method according to the present invention. First, an application generates a printing command at a user's request, in step 310. Next, the graphic engine unit 120 divides the area of a printing page into image data and font data when the printing command is received from the application, in step 320. Then, the printer driver 130 performs the following printing command by determining whether the page area is the image data or the font data, in step 330.

That is, if it is determined in step 330 that the page area is image data, it is determined whether the graphic mode selected by a user is a vector mode, in step 340. If it is determined that the document area is not image data, the document area is determined to be the font data. Thus, a font command is generated, in step 335, and then it is transferred to a printer, in step 390. Then, if it is determined that the graphic mode is a vector mode, a vector mode in which image data is divided according to objects and processed as an object-unit command is executed, in step 350. Otherwise, a raster command is produced by generating a bitmap, in step 375.

Figure 4:
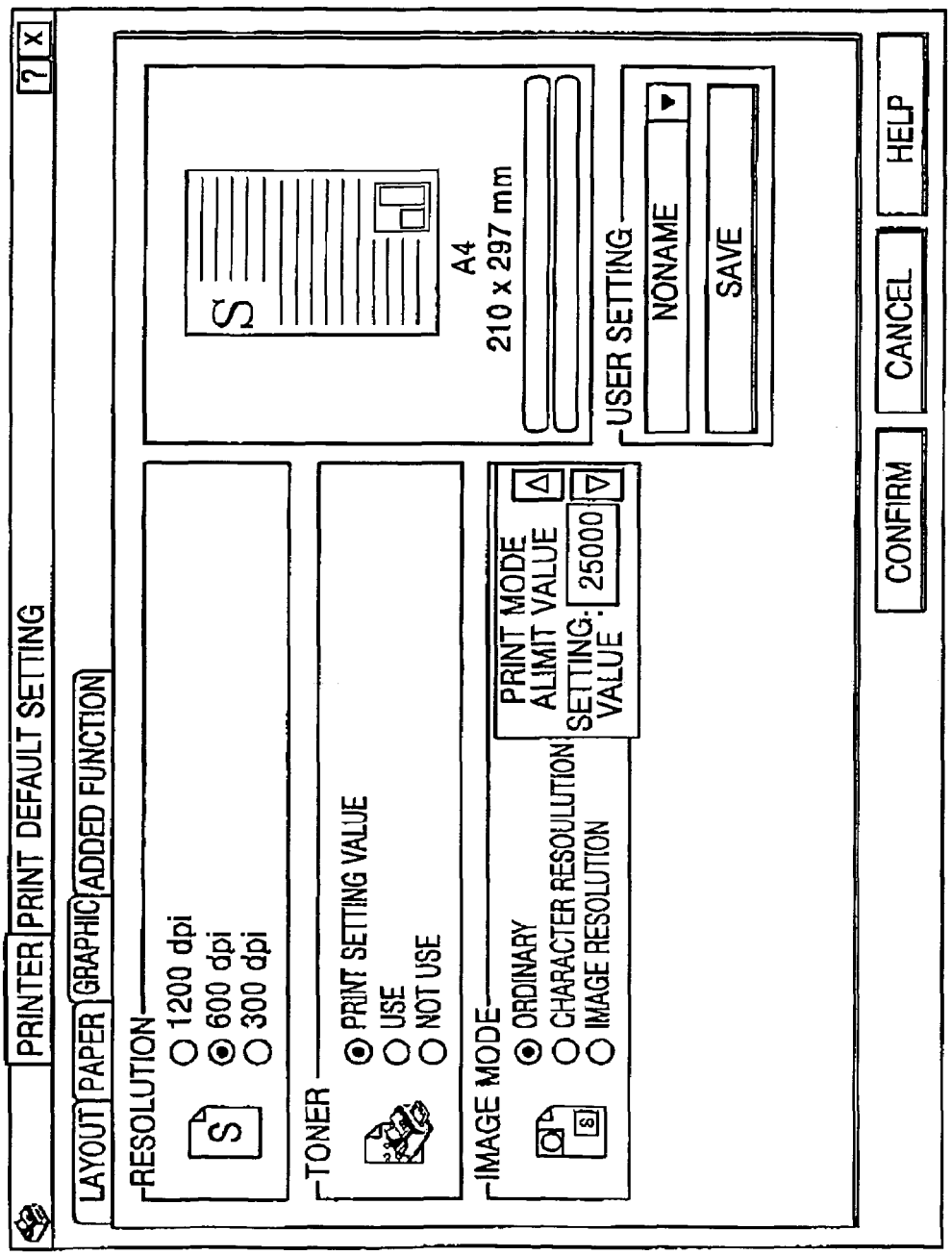
FIG. 4 is a view of a User Interface (UI) window of a printer driver.

After the step 350, if it is determined in step 360 that there are vector object functions for outputting each of the objects, the number of functions is counted, in step 370, and then the counted value is compared with a predetermined limit value, in step 372. A predetermined limit value is calculated by counting the number of objects of print data. The predetermined limit value is changed according to the size and type of a file and the resolution of an image. In an exemplary embodiment of the present invention, image data is changed from a vector mode to a raster mode when the number of vector objects or vector commands is about 20,000-30,000. Thus, a predetermined limit value is set to about 25,000. Also, the set limit value is displayed in a User Interface (UI) window of a printer driver as illustrated in FIG. 4 so that a user can arbitrarily change the limit value. The present limit value can be set by directly typing a value in the "Set Value" field in the UI window or by using a mouse or up/down keys. If it is determined in step 360 that there are no vector object functions for outputting each of the objects, only areas having no objects are processed as a bitmap using a raster mode, in step 362. In a raster mode, an image is converted into a bitmap without dividing the image into objects, in contrast with a vector mode. Here, an example of an object function written in C Language to output an object is provided as follows:

```
BOOL DrvStrokePath (
    IN SURFOBJ *pso,
    IN PATHOBJ *ppo,
    IN CLIPOBJ *pco,
    IN XFORMOBJ *pxo,
    IN BRUSHOBJ *pbo,
    IN POINTL *pptlBrushOrg,
    IN LINEATTRS *plineattrs,
    IN MIX mix
    );
```

DrvStrokePath strokes a path when called by GDI. If the driver has hooked the function, and if the appropriate GCAP's are set, GDI calls DrvStrokePath when GDI draws a line or curve with any set of attributes. Parameter "pso" identifies the surface on which to draw. Parameter "ppo" points to a PATHOBJ structure. GDI PATHOBJ_Xxx service routines are provided to enumerate the lines, Bezier curves, and other data that make up the path. This indicates what is to be drawn. Parameter "pco" points to a CLIPOBJ structure. GDI CLIPOBJ_Xxx service routines are provided to enumerate the clip region as a set of rectangles. Optionally, all the lines in the path may be enumerated preclipped by CLIPOBJ. This means that drivers can have all their line clipping calculations done for them. Parameter "pxo" points to a XFORMOBJ. This is only needed when a geometric wide line is to be drawn. It specifies the transform that maps world coordinates to device coordinates. This is needed because the path is provided in device coordinates but a geometric wide line is actually widened in world coordinates. The XFORMOBJ can be queried to find the transform. Parameter "pbo" specifies the brush to be used when drawing the path. Parameter "pptlBrushOrg" points to the brush origin used to align the brush pattern on the device. Parameter "plineattrs" points to a LINEATTRS structure. Note that the elStyleState member must be updated as part of this function if the line is styled. Also not that the ptlLastPel member must be updated if a single pixel with cosmetic line is being drawn. Parameter "mix" specifies how to combine the brush with the destination.

Thereafter, if the counted value is equal to or greater than the predetermined limit value, a raster command for processing a page area corresponding to the counted functions as a bitmap is produced, in step 375. Otherwise, a vector command for processing the page area in units of objects is produced, in step 380. Thus, when bitmap data is produced using a raster mode, data is significantly simplified, and the printing speed is also significantly increased. Then, the vector command, the raster command and the font command are transferred to a printer, in step 390.

Although the invention has been described with reference to a particular embodiment, it will be apparent to one of ordinary skill in the art that modifications of the described embodiment may be made without departing from the spirit and scope of the invention.

According to the present invention as described above, when a document having complicate data is printed, a printer driver automatically converts a vector mode set as a default into a raster mode, whereby the time to analyze data and form an image and the overflow of memory, which may be generated due to the above operations, are reduced. Therefore, the printing speed of a printer is improved, and the size of memory can be reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A printer controlling method, comprising:
 receiving print data;
 calculating a number of object functions for outputting objects of the print data;
 determining whether the received print data is to be processed in a raster mode or in a vector mode based on comparison of the calculated number of object functions for outputting the objects with a predetermined limit value; and
 changing a processing mode of the print data according to the determined mode.

2. The printer controlling method of claim 1, wherein calculating the number of object functions for outputting the objects comprises counting the number of object functions for outputting the objects of the print data.

3. The printer controlling method of claim 1, further comprising changing the predetermined limit value according to a size and type of a file and a resolution of an image.

4. The printer controlling method of claim 1, further comprising displaying the predetermined limit value on a user interface.

5. The printer controlling method of claim 1, further comprising arbitrarily changing the predetermined limit in response to an input by a user.

6. The printer controlling method of claim 1, wherein the changing of the processing mode is performed by a printer driver.

7. A printer controlling apparatus comprising:
 a graphic engine unit adapted to receive print data;
 a printer driver operatively connected to the graphic engine unit and adapted to:
  calculate a number of object functions for outputting objects in the print data;
  determine whether the received print data is to be processed in a raster mode or a vector mode based on a comparison of the calculated number of object functions for outputting the objects with a predetermined limit value; and
  changing a processing mode of the print data according to the determined mode.

8. The apparatus of claim 7, further comprising a user interface operatively connected to the print driver and adapted to display the predetermined limit value.

9. The apparatus of claim 8, wherein the user interface is adapted to set predetermined limit value in response to an input from a user.

* * * * *